June 24, 1930. F. BROCHET 1,765,902
APPARATUS FOR FREEING POTATOES FROM GERMS
Filed March 21, 1928
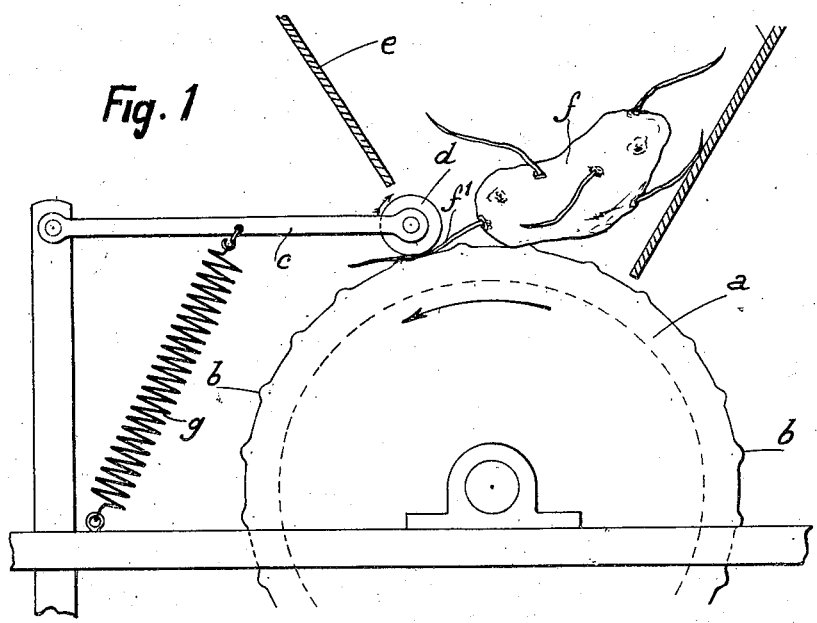
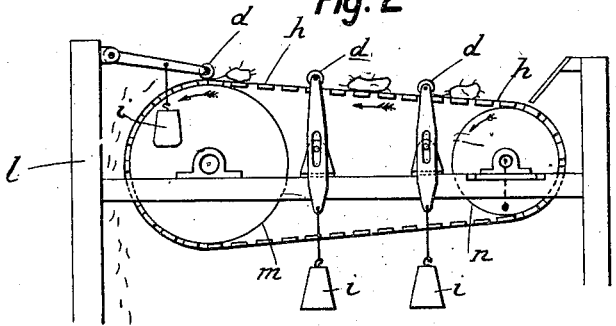
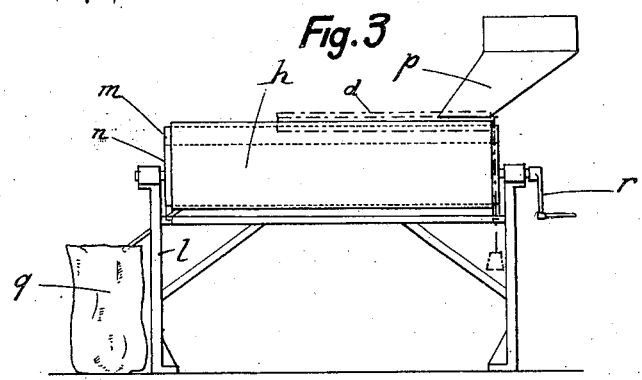

UNITED STATES PATENT OFFICE

FERNAND BROCHET, OF FONTENAY-TRESIGNY, FRANCE

APPARATUS FOR FREEING POTATOES FROM GERMS

Application filed March 21, 1928, Serial No. 263,531, and in France March 31, 1927.

This invention relates to an apparatus, possessing great efficiency, designed to mechanically pull out the germs of potatoes without deteriorating the potato.

This apparatus is characterized by the use in combination of a device for conveying the potatoes and of a roller in contact with said conveying device and adapted to rotate in the corresponding direction so that the germs held between the conveying device and the roller are pulled out.

An embodiment of the invention is illustrated, by way of example, in the accompanying drawing, in which:

Fig. 1 shows in side elevation an apparatus according to the invention.

Fig. 2 shows in side-elevation the apparatus of another form of construction.

Fig. 3 is an end elevation of the apparatus on reduced scale.

The system, according to the invention is as follows: a conveying device (Fig. 1) consisting preferably of a cylinder or drum $a$ of a large diameter is rotated, in the direction of the arrow. On this drum $a$, parallel to its axis, a roller $d$ of small diameter rests, which has a journal at each end journaled in a holder $c$, free to yield in upward direction and pulled by the action of a spring $g$ or of a heavy mass against the drum $a$. The roller $d$ is rotated by the rotation of the drum $a$ in opposite direction as said drum rotates.

A potato $f$ placed on the drum $a$ is moved by the same towards the roller $d$. When the potato comes into touch with the roller $d$, one of the germs $f'$ of the potato is caught between the drum and the roller so that the potato is pulled against the roller $d$ and the germ $f'$ is pulled out by the traction exerted upon the same.

The potato, liberated as soon as the germ has been pulled out and submitted to the action of the rotating drum, alters its position and turns over so that, at a certain moment, another germ is caught between the roller and the drum to be pulled out as described above. The potatoes placed in a funnel-shaped chamber $e$ above the drum $a$ are therefore shaken under such conditions that their germs get successively under the small roller $d$ to be pulled out as explained. According to the invention the drum $a$ has on its periphery longitudinal rings or ribs $b$ of rounded section designed to assist the conveying and turning of the potatoes and to avoid crushing of the germ and breaking the same before it has been pulled out.

The rings or ribs $b$ prevent the germ sticking on the drum or on the roller and ensure removing of the same without clogging the elements for pulling out the germs.

The small roller $d$ may be resiliently pressed against the drum $a$ by any suitable means, either by a spiral spring $g$ as shown in Fig. 1 or by counter-weight or the like.

In any case this small roller $d$ is placed on the drum in front of the vertical axial plane of the drum in the direction of rotation of the same, so that the potato remains permanently in contact with the roller $d$.

One machine of this kind may comprise any desired number of drums of any desired length and diameter, provided the roller $d$ for each drum be small enough to prevent small potatoes from engaging between the roller and the drum, only the germs being clamped.

As shown, in Figs. 2 and 3 the device for conveying the potatoes may consist of an endless band $h$, reinforced by sticks and guided around two cylinders $m$, $n$ journaled in a frame $l$ and adapted to rotate around their axles. On this endless band $h$ rest several small rollers $d$ submitted to the action of counter-weights $i$ or of springs.

In this manner at one side of each roller, in the form of construction shown at the right of the roller, a working zone is provided onto which the potatoes are supplied from a hopper $p$ arranged at one side of the machine. In each zone the potatoes conveyed by the endless band move towards the corresponding small roller so that a germ is caught between the endless band and the roller to be pulled out in the manner above described.

The potatoes freed from their germs drop at the other side of the machine into a sack $q$.

A crank-handle r serves for rotating the cylinders which move the endless band.

The cylinders m, n are of different diameters in order that the endless band, on the upper portion of which the potatoes are deposited, is inclined in upward direction towards the small rollers d. To obtain this inclination of the endless band cylinders of similar diameter might be arranged at different heights.

The endless band may either consist of a strong canvas, reinforced by small wooden bars, or of wire-gauze having narrow holes, or of lamellæ of wood or of metal attached to two belts.

When the endless band is made of wire-gauze or of metal-lamellæ, it might serve itself in a certain measure for pulling out the germs as these are caught in the links of the wire-gauze or between the sticks and then pulled out.

One of the cylinders is preferably shiftably mounted on the frame so as to maintain the endless band well stretched.

The rollers d, instead of being driven by the conveying device, might in both forms of construction be driven mechanically.

I claim:

An apparatus for freeing potatoes from germs, comprising in combination a rotatable drum adapted to support the potato, longitudinal rounded ribs on said drum, a cylinder of small diameter bearing against said drum parallel to said ribs, and means for elastically pressing said cylinder against said drum so that it successively presses against the periphery of said drum and against said rounded ribs.

In testimony whereof I affix my signature.

FERNAND BROCHET.